United States Patent [19]
Boike

[11] Patent Number: 5,509,750
[45] Date of Patent: Apr. 23, 1996

[54] ROTATABLE COUPLING FOR CORE ELEMENT

[75] Inventor: Randy J. Boike, Clarkston, Mich.

[73] Assignee: Teleflex Incorporated, Limerick, Pa.

[21] Appl. No.: 175,151

[22] Filed: Dec. 29, 1993

[51] Int. Cl.⁶ .................... F16C 1/14; F16B 21/18
[52] U.S. Cl. .............. 403/164; 403/327; 74/502.4; 74/502.6
[58] Field of Search ............... 74/502.4, 502.6, 74/500.5, 502; 192/114 R, 114 T; 403/164, 165, 326, 325, 327

[56] References Cited

U.S. PATENT DOCUMENTS

| | | | |
|---|---|---|---|
| 1,442,223 | 1/1923 | Knebusch | 403/326 |
| 2,257,852 | 10/1941 | Nicol | 74/472 |
| 2,899,836 | 8/1959 | Cushman et al. | 74/502 |
| 3,173,266 | 3/1965 | Shutt | 403/164 X |
| 3,920,340 | 11/1975 | Jones | 74/502.4 X |
| 4,111,464 | 9/1978 | Asano et al. | 285/111 |
| 4,645,245 | 2/1987 | Cunningham | 285/321 |
| 4,762,024 | 8/1988 | Graft | 403/326 X |
| 4,822,228 | 4/1989 | Senft et al. | 403/326 X |
| 4,854,185 | 8/1989 | Lichtenberg et al. | 74/502.4 X |
| 4,941,764 | 7/1990 | Breitwieser et al. | 403/326 X |
| 5,220,832 | 6/1993 | Petruccello | 74/502.4 |
| 5,431,256 | 7/1995 | Wen | 74/502.4 X |

FOREIGN PATENT DOCUMENTS

| | | | |
|---|---|---|---|
| 665752 | 9/1938 | Germany | 403/327 |
| 595030 | 6/1959 | Italy | 74/502.4 |

*Primary Examiner*—Anthony Knight
*Attorney, Agent, or Firm*—Howard & Howard

[57] ABSTRACT

A motion transmitting remote control cable assembly (10) for transmitting motion in a curved path includes a core element (14) having a female section (16) defining an opening (18) and a male section (20) matingly engaged within the opening of the female section. A lock (22) mechanically interconnects the male and female sections (20,16) to prevent relative sliding movement between the male and female sections while allowing relative axial rotation. The lock (22) includes an abutment (24) disposed on the male section (20) for moving radially between a compressed position to allow the male section (20) to slide axially into the female section (16) and an extended position to interconnect with the female section and prevent further axial sliding between the male and female sections while allowing relative axial rotation therebetween.

17 Claims, 1 Drawing Sheet

ROTATABLE COUPLING FOR CORE ELEMENT

TECHNICAL FIELD

The subject invention relates to motion transmitting remote control cable assemblies of the type for transmitting motion in a curved path, and more particularly to rotatable couplings for coupling sections of a motion transmitting core element.

BACKGROUND OF THE INVENTION

Rotatable couplings for coupling first and second sections of a core element are old and well-known in the push-pull art. Among these couplings are the ball and socket coupling, and the slug or enlargement coupling wherein a slug is attached to a core element to prevent the core element from being pulled through a hole small relative to the slug. U.S. Pat. No. 2,257,852 to Nicol and 2,899,836 to Cushman et al. teach rotatable couplings where a male section of core element is matingly engaged in a female section. Axial rotation can occur, but the two sections are locked against any axial sliding once coupled. This can be very important in particular applications where the core element must be maintained in a particular state of tension or compression.

While these two prior art assemblies solve a number of problems, they leave some problems unsolved. First, in both cases the design is not as efficient or compact as it could be. The U.S. Pat. No. 2,899,836 teaches the use of several separate parts. The U.S. Pat. No. 2,257,852 includes fewer parts to maintain the coupling, but because it includes a locking pin that extends through both the male and female sections of the core element, the coupling is not as compact as it could be. This could present problems where the environment calls for a very compact coupling. Also, both of the prior art couplings involve more effort to assemble than is necessary. This effort could translate into increased time and cost for assembly.

Prior art patents such as U.S. Pat. Nos. 4,645,245 to Cunningham and 4,111,464 to Asano et al. teach Quick Connect couplings for hoses, but these couplings do not prevent axial sliding between the connected elements, nor do they suggest that the couplings can be rotatable. Rubber "O" rings typically used in these couplings prevent or inhibit relative rotation between the male and female coupled members.

SUMMARY OF THE INVENTION AND ADVANTAGES

A motion transmitting remote control cable assembly for transmitting motion in a curved path comprises a flexible conduit and a flexible motion transmitting core element slideably supported in the conduit. The core element includes a female section defining an opening and a male section disposed in the opening. Locking means mechanically interconnects the male and female sections and prevents relative sliding movement between the male and female sections while allowing relative axial rotation. The assembly is characterized by the locking means including abutting means disposed on the male section for moving radially between a compressed position to allow the male section to slide axially into the female section and an extended position to interconnect with the female section and prevent further axial sliding between the male and female sections while allowing relative axial rotation therebetween.

The applicant has adapted the Quick Connect couplings from the hose art into the push-pull cable art to create a new, compact, and simple to install rotatable coupling for core elements. Applicant has redesigned this compact and easy to install coupling from the hose art to prevent axial sliding between the coupled members while allowing for axial rotation.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
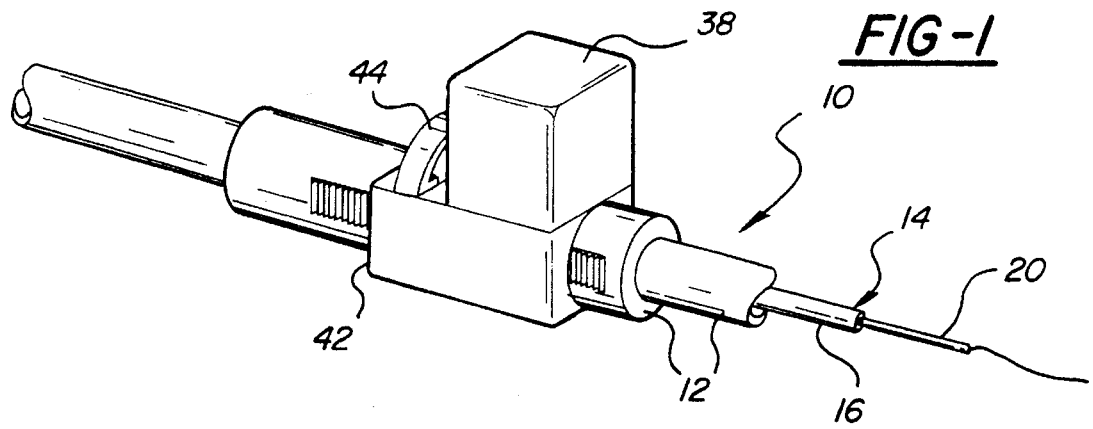
FIG. 1 is a perspective view of the subject coupling incorporated into a particular push-pull assembly.
Figure 2:
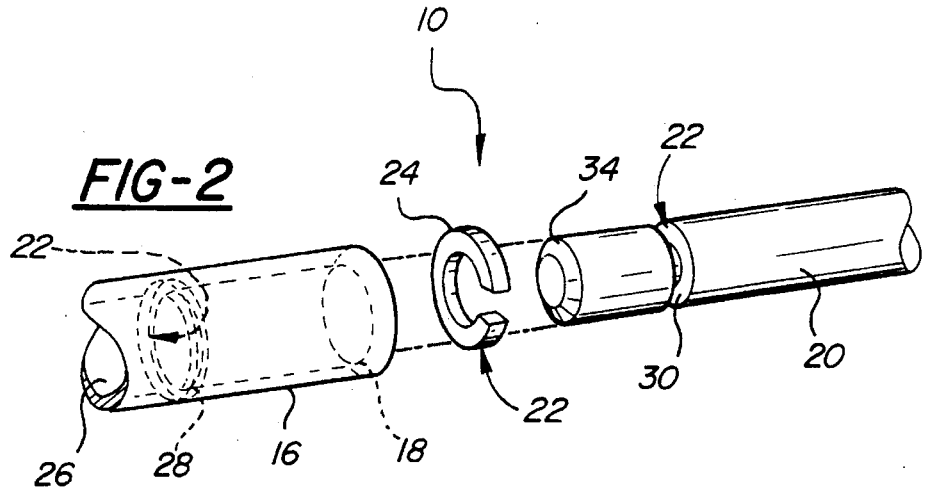
FIG. 2 is an exploded perspective view of the subject coupling showing the male and female sections and the locking means.
Figure 3:
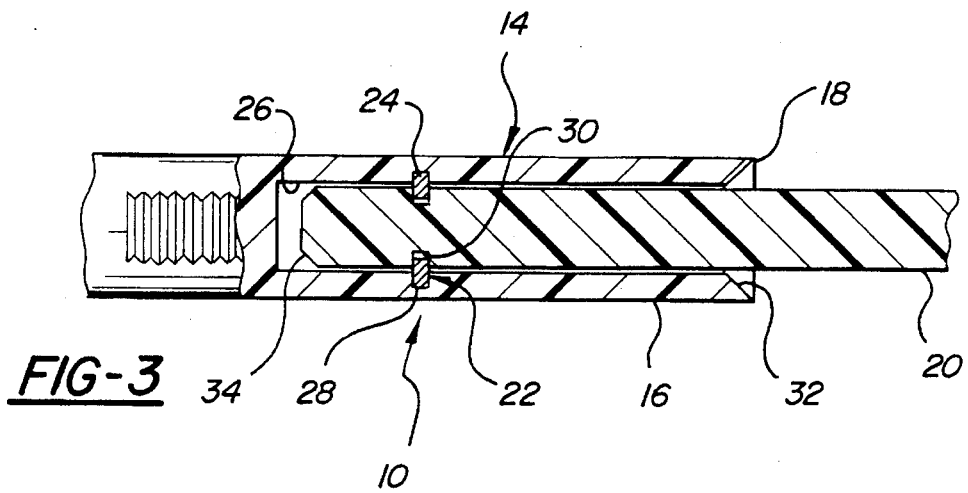
FIG. 3 is a side view partially cut away to show the subject coupling.
Figure 4:
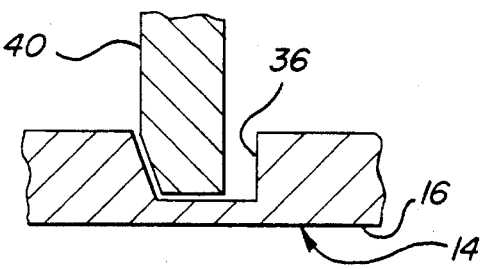
FIG. 4 is a side section view of the female section of the core element showing the notch and the solenoid plunger which moves into and out of engagement within the notch.

Referring to the Figures wherein like numerals indicate like or corresponding parts throughout the several views, a motion transmitting remote control cable assembly is generally shown at 10.

The assembly 10 comprises a flexible conduit 12 and a flexible motion transmitting core element generally indicated at 14 slideably supported in the conduit and defining the longitudinal axis of the assembly. The core element 14 includes a female section 16 defining an opening 18 and a male section 20 matingly disposed in the opening 18. Locking means generally indicated at 22 mechanically interconnects the male and female sections 20,16 and prevents relative sliding movement, i.e., axial sliding movement, between the male and female sections 20,16 while allowing relative axial rotation, i.e., rotation about the axis between the male and female sections (20,16). The assembly 10 is characterized by the locking means 22 including abutting means 24 disposed on the male section 20 for moving radially between a compressed position to allow the male section 20 to slide axially into the female section 16 and an extended position to interconnect with the female section and prevent further axial sliding between the male and female sections 20,16 while allowing relative axial rotation therebetween.

The female section 16 defines a cylindrical inside surface 26 having a first annular groove 28 disposed therein. This groove 28 in the female section 16 is U-shaped, and specifically rectangular in cross section. In other words, at any given section the bottom of the groove 28 is flat and the sides extending up from the bottom of the groove toward the surface of the female member are straight, as opposed to being curved or rounded.

The male section 20 defines a second annular groove 30 in its outside surface, with the groove having a U-shaped, e.g. rectangular, cross section.

The abutting means 24 is an outwardly biased "C" shaped spring clip 24 disposed in the groove 30 in the male section 20, the spring clip 24 having a compressed outer diameter smaller than the outer diameter of the male section 20 and an uncompressed outer diameter greater than the outer diameter of the male section. The spring clip 24 has such a compressed diameter because the male and female sections 20,16 engage so snugly. If the spring clip 24 had a larger compressed diameter the male and female sections 20,16 could not matingly engage. The spring clip 24 has a width for fitting snugly into the width of the grooves 28,30 in the male and female sections 20,16. The clip 24 also has a rectangular cross section.

The clip 24 and the grooves 28,30 all have rectangular cross sections, and sizes similar to one another so that the coupling allows little or no axial play. The spring clip 24 fits snugly in both grooves 28,30. In other words, once the male and female sections 20,16 are coupled, there should be no possibility for relative axial sliding between the two.

The spring clip 24 has an inner diameter greater than the outer diameter of the groove 30 in the male section 20. This is to allow the clip 24 to be compressed when the male section 20 is inserted into the female section 16. If the inner diameter of the spring clip 24 equalled the diameter on the groove 30, the spring clip 24 could not be compressed.

The spring clip 24 is made from rigid material such as metal. In other words, the clip is not made from softer, more elastic materials such as rubber, etc. To make the clip from this material would allow for undesirable axial sliding between the male and female sections 20,16.

The female section 16 includes camming means 32 at the opening 18 for engaging the spring clip 24 when the male section 20 is inserted into the female section 16 and forcing or camming the spring clip 24 into the compressed position when an inserting force is applied to the male member sufficient to overcome the outward biasing force of the spring clip 24. In other words, the camming means 32 translates the axial force inserting the male member into the female member into a radial force capable of compressing the spring clip 24. In this manner the male section 20 may slide into the female section 16 with the spring clip 24 remaining compressed by the cylindrical inner surface until the spring clip 24 reaches the annular groove 28 within the female section 16. The camming means 32 includes a tapered surface extending radially inwardly. In other words, there is a frustuconical or funnel shaped surface 32 at the opening 18 of the female member for compressing the spring clip 24 when the male member is inserted into the female member. It has been said that the camming means 32 is at the opening 18 of the female section 16, but it should be understood that the camming means 32 could be anywhere between the opening 18, i.e. the end of the female section 16 and the annular groove 28 in the inside of the female section 16.

The female section 16 includes an inside diameter substantially equal to the outside diameter of the male section 20. This is to provide a snug fit between the male and female sections 20,16. If the engaging parts of these sections are rigid, then these parts will be better supported if they fit snugly together. In other words, the snug fit will prevent rigid members from undesirable wobbling or swiveling with respect to one another.

The male section 20 includes a telescoping end 34 for disposing into the female section 16. The telescoping end 34 includes a tapered surface which tapers radially inwardly so that the telescoping end 34 fits easily into the opening 18 in the female section 16. In other words, the end 34 of the male section 20 defines a frustuconical surface 34 so that the tip of the male section 20 is narrow in diameter relative to the rest of the male section. This enables one to "thread" the tip 34 of the male section 20 easily into the opening 18 in the female section 16.

The subject rotating coupling is part of a larger brake transmission shift interlock (BTSI) cable assembly. These assemblies are well known in the push-pull art. They are installed in vehicles to require the vehicle operator to depress the brake before shifting from one transmission setting to another: i.e. from "PARK" to "DRIVE." The core element 14, which extends from the transmission shifter to the transmission, includes a notch 36 disposed therein at some point along the core element 14. A solenoid 38 is mounted on the conduit 12 adjacent the notch 36 on the core element 14. The solenoid 38 moves a plunger 40 in reciprocating fashion from a locked position in which the plunger extends through the conduit 12 into the notch 36 and prevents axial movement of the core element 14, and an unlocked position in which the plunger 40 is removed from the notch 36 to allow movement of the core element 14.

The assembly 10 also includes positioning means 42 interconnecting the solenoid 38 and the conduit 12 for adjustably positioning the solenoid 38 axially along the conduit 12. The positioning means 42 is a slideable mounting for the solenoid 38 with a locking feature 44 to lock the solenoid at a given position along the conduit 12 once the position has been selected.

The rotating coupling exists to solve a particular problem with a particular embodiment of this BTSI assembly. One of the coupled sections 16,20 of the core element 14 may include a length of flexible cable. This is to allow the core element 14 to travel through a curved path through an engine compartment, for example. When the flexible section of cable is routed through its path, some twisting forces may be operating on the cable. If these forces are transferred to the other section, i.e. the section having the notch, the solenoid pin or plunger 40 may not align properly in the notch 36. Also, if the pin or plunger 40 is in the notch 36 when the core element section 16,20 is twisted, the pin may become stuck, preventing the operator from operating the vehicle. The rotating coupling is one solution to the problem in that it prevents twisting forces from being transmitted from one section 16,20 of the core element 14 to the other 16,20.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A motion transmitting remote control cable assembly (10) for transmitting motion in a curved path comprising:

a flexible conduit (12);

a flexible motion transmitting core element (14) slideably supported in said conduit (12) and defining the longitudinal axis of the assembly, said core element including:

a female section (16) defining an opening (18);

a male section (2) disposed in said opening (18);

locking, means (22) for mechanically interconnecting said male and female sections (20,16) and preventing axial sliding movement between said male and female sections (20,16) while allowing relative rotation about said axis between said male and female sections (20,16);

characterized by said locking means (22) including abutting means (24) disposed on said male section (20) for moving radially between a compressed position to allow said male section (2) to slide axially into said female section (16) and an extended position to interconnect with said female section (16) and prevent further axial sliding between said male and female sections (20,16) while allowing said relative rotation therebetween said core element (14) including a notch (36) disposed therein.

2. An assembly (10) as set forth in claim 1 further characterized by said female section (16) defining a cylindrical inside (26) surface having a first annular groove (28) disposed therein.

3. An assembly (10) as set forth in claim 2 further characterized by said abutting means (24) having a width for fitting into the width of said first annular groove (28).

4. An assembly (10) as set forth in claim 3 further characterized by said abutting means (24) having a rectangular cross section.

5. An assembly (10) as set forth in claim 4 further characterized by said first annular groove (28) in said female section (16) being U-shaped in cross section.

6. An assembly (10) as set forth in claim 5 further characterized by said male section (20) defining a second annular groove (30) in said outside surface, said second annular groove having a rectangular cross section.

7. An assembly (10) as set forth in claim 6 further characterized by said abutting means (24) being an outwardly biased "C" shaped spring clip disposed in said first annular groove in said male section (20), said spring clip (24) having a compressed outer diameter smaller than the outer diameter of said male section (20) and an uncompressed outer diameter greater than the outer diameter of said male section (20).

8. An assembly (10) as set forth in claim 7 further characterized by said spring clip (24) having an inner diameter greater than the outer diameter of said second annular groove (30) in said male member.

9. An assembly (10) as set forth in claim 8 further characterized by said female section (16) including camming means (32) at said opening (18) for engaging said spring clip (24) when said male section (20) is inserted into said female section (16) and forcing said spring clip (24) into said compressed position when an inserting force is applied to said male member sufficient to overcome the outward biasing force of said spring clip (24) whereby said male section (20) may slide into said female section (16) with said spring clip (24) remaining compressed by said cylindrical inner surface until said spring clip (24) reaches said first annular groove (28) within said female section (16).

10. An assembly (10) as set forth in claim 9 further characterized by said camming means (32) including a tapered surface extending radially inwardly.

11. An assembly (10) as set forth in claim 1 further characterized by said female section (16) including an inside diameter substantially equal to the outside diameter of said male section (20).

12. An assembly 10 as set forth in claim 1 further characterized by including a solenoid (38) mounted on said conduit (12) adjacent said notch (36) on said core element (14), said solenoid including a plunger (4) for reciprocating from a locked position in which said plunger extends into said notch (36) and prevents axial movement of said core element (14), and an unlocked position in which said plunger is removed from said notch to allow movement of said core element.

13. An assembly (10) as set forth in claim 12 further characterized by including positioning means (42) interconnecting said solenoid (38) and said conduit (12) for adjustably positioning said solenoid (38) axially along said conduit (12).

14. An assembly (10) as set forth in claim 1 further characterized by said male section (20) including a telescoping end (34) for disposing into said female section (16), said telescoping end (34) including a tapered surface tapering radially inwardly so that said telescoping end fits easily into said opening (18) in said female section (16).

15. An assembly (10) as set forth in claim 1 further characterized by said abutting means (24) being made from rigid material.

16. A motion transmitting remote control cable assembly (10) for transmitting motion in a curved path comprising:

a flexible conduit (12);

a motion transmitting core element (14) slideably supported in said conduit (12) including first and second ends extending externally of said conduit (12);

said core element (14) including a female section (16) disposed between said first and second ends, said female section (16) including a cylindrical socket (26);

said core element (14) further including a male section (20) receivable into said socket (26);

a first annular groove (28) disposed in said socket (26) of said female section (16) and a corresponding second annular groove (30) disposed in said male section (20); and a C-shaped spring clip (24) disposed simultaneously in said first annular groove (28) and said second annular groove (30) for interconnecting said male (20) and female (16) sections of said core element (14) between said first and second ends thereof; said core element (14) including a notch (36) disposed therein.

17. An assembly as set forth in claim 16 wherein said male (20) and female (16) sections are disposed externally of said conduit (12).

* * * * *